United States Patent
Suzuki et al.

(10) Patent No.: US 7,992,379 B2
(45) Date of Patent: Aug. 9, 2011

(54) EXHAUST PURIFICATION DEVICE FOR ENGINE

(75) Inventors: Yasuko Suzuki, Kawasaki (JP); Hiroaki Fujita, Kawasaki (JP); Satoshi Hiranuma, Kawasaki (JP); Shinichi Saito, Kawasaki (JP); Yoshio Nakayama, Kawasaki (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 469 days.

(21) Appl. No.: 12/176,311

(22) Filed: Jul. 18, 2008

(65) Prior Publication Data

US 2009/0019837 A1   Jan. 22, 2009

(30) Foreign Application Priority Data

Jul. 20, 2007 (JP) ................................ 2007-189524

(51) Int. Cl.
*F01N 3/36* (2006.01)

(52) U.S. Cl. ........................................ 60/286; 60/295
(58) Field of Classification Search .................. 60/286, 60/295, 301, 317
See application file for complete search history.

(56) References Cited

U.S. PATENT DOCUMENTS

2007/0245718 A1 * 10/2007 Cheng et al. ................. 60/286

FOREIGN PATENT DOCUMENTS

| CN | 1863987 A | | 11/2006 |
|---|---|---|---|
| CN | 1957161 A | | 5/2007 |
| CN | 1985080 A | | 6/2007 |
| JP | 2002-213233 A | | 7/2002 |
| JP | 2003-232218 A | | 8/2003 |
| JP | 2004-324585 A | | 11/2004 |
| JP | 2005-127271 A | | 5/2005 |
| JP | 2005-256633 A | | 9/2005 |
| JP | 2005256633 A | * | 9/2005 |
| JP | 2005-273579 A | | 10/2005 |
| JP | 2006-029233 A | | 2/2006 |
| JP | 2006-183509 A | | 7/2006 |
| JP | 2006183509 A | * | 7/2006 |
| JP | 2007-170382 A | | 7/2007 |

OTHER PUBLICATIONS

Specification, claims, abstract and drawings of related co-pending U.S. Appl. No. 12/176,315, filed on Jul. 18, 2008, pp. 1-20.

(Continued)

*Primary Examiner* — Thomas E Denion
*Assistant Examiner* — Jonathan Matthias
(74) *Attorney, Agent, or Firm* — Rossi, Kimms & McDowell LLP

(57) ABSTRACT

An exhaust purification device for an engine comprises a catalytic device for purifying exhaust by using an additive, a deflecting device for allowing the exhaust to flow through and causing the exhaust to be agitated, upstream of the catalytic device, an additive injection device for injecting an additive, downstream of the deflecting device, a temperature detection device for detecting exhaust temperature, downstream of the deflecting device, and a control unit for controlling the additive injection device on the basis of the exhaust temperature detected by the temperature detection device. The temperature detection device has a temperature detection part located within a region where the exhaust having passed through the deflecting device has increased velocity.

2 Claims, 4 Drawing Sheets

OTHER PUBLICATIONS

Notice of Allowance issued in corresponding Korean Patent Application No. 9-5-2010-025648103 dated Jun. 16, 2010. Only English translation is provided; foreign-language document was previously provided with the IDS filed Aug. 3, 2010.

Notice of Allowance issued in corresponding Korean Patent Application No. 9-5-2010-025648057 dated Jun. 16, 2010. Cited in related co-pending U.S. Appl. No. 12/176,315. Only English translation is provided; foreign-language document was previously provided with the IDS filed Aug. 3, 2010.

Office Action issued in corresponding Chinese Patent Application No. 200810134711.2 dated Oct. 9, 2009. Only English translation is provided; foreign-language document was previously provided with the IDS filed Jan. 6, 2010.

* cited by examiner

EXHAUST PURIFICATION DEVICE FOR ENGINE

This application is based on, and claims priority to, Japanese Patent Application No: 2007-189524, filed on Jul. 20, 2007. The disclosure of the priority application, in its entirety, including the drawings, claims, and the specification thereof, is incorporated herein by reference.

BACKGROUND OF THE INVENTION

1. Field of the Invention

This invention relates to an exhaust purification device for an engine, specifically, an exhaust purification device designed such that an additive injected from an additive injection means is supplied to a catalytic device in a state of being diffused in exhaust.

2. Description of the Related Art

An exhaust purification device including an SCR catalyst (selective reduction-type NOx catalyst) is an example of exhaust purification device which purifies exhaust by converting harmful substances in the exhaust into harmless substances using an additive. An exhaust purification device of this type is disclosed in Unexamined Japanese Patent Publication No. 2003-232218 (hereinafter referred to as Patent Document 1), for example.

The exhaust purification device disclosed in Patent Document 1 includes a mixer for agitating exhaust, located upstream of an SCR catalyst in an exhaust pipe of an engine and provided with a plurality of dividing plates, and an injection nozzle for injecting urea aqueous solution, located upstream of the mixer. While the engine is operating, urea aqueous solution is injected from the injection nozzle to the exhaust flow in the exhaust pipe. The urea aqueous solution injected is diffused and atomized in the exhaust by the mixer's agitation, while being hydrolyzed by heat and vapor in the exhaust to form ammonia ($NH_3$). On the SCR catalyst, the ammonia thus formed serves as a reducing agent and causes reduction of NOx (nitrogen oxides) in the exhaust to harmless $N_2$ (nitrogen)

In such exhaust purification device, the amount of urea aqueous solution injected from the injection nozzle should desirably be controlled according to exhaust temperature. Further, when the exhaust temperature has dropped below a lower limit allowing a desired level of ammonia formation, the injection of urea aqueous solution needs to be stopped. Thus, the exhaust purification device of Patent Document 1 includes a temperature sensor disposed between the mixer and the SCR catalyst to control the amount of urea aqueous solution injected from the injection nozzle according the exhaust temperature detected by the temperature sensor.

In the exhaust purification device disclosed in Patent Document 1, however, the temperature sensor is apart from the injection nozzle, so that the urea aqueous solution injection quantity is controlled far upstream of where the exhaust temperature is detected. This hinders the exhaust purification device from controlling the urea aqueous solution injection quantity appropriately. To solve this problem, it is conceivable to dispose the temperature sensor near the injection nozzle. This solution, however, causes the following new problems:

In this case, part of the urea aqueous solution injected from the injection nozzle adheres to the temperature sensor near the injection nozzle, and due to the cooling action of the adhering urea aqueous solution, which is at low temperature, and the latent heat of vaporization of the urea aqueous solution, the temperature detected by the temperature sensor is lower than the actual exhaust temperature. In FIG. 4, how the exhaust temperature is detected by such conventional technology is indicated in a broken line. The graph shows that the value detected by the temperature sensor frequently experiences a temporary drop. As seen in FIG. 4, the timing of the temperature drop almost corresponds to the timing of the urea aqueous solution injection, indicated below the broken line. From this, it can be inferred that the urea aqueous solution adhering to the temperature sensor causes the temporary drop in the value detected by the temperature sensor.

Consequently, in the exhaust purification device with the temperature sensor disposed as described above, the urea aqueous solution injection quantity is controlled inappropriately on the basis of the detected value departing from the true value. For example, although the exhaust is actually at the temperature that allows the reduction of NOx to be caused by injecting the urea aqueous solution, it is determined that the exhaust temperature is below an allowable lower limit, so that the urea aqueous solution injection is stopped. This means missing the timing to reduce NOx, and therefore, failing to make the best use of the NOx-reducing performance of the SCR catalyst to purify the exhaust. It is without saying that later additional injection of the urea aqueous solution in the amount corresponding to the injection stopped only leads to excessive injection of the urea aqueous solution, which leads to useless consumption of urea aqueous solution and ammonia slip from the SCR catalyst.

SUMMARY OF THE INVENTION

An aspect of the present invention is directed to an exhaust purification device for an engine, comprising a catalytic device disposed in an exhaust passage of the engine, for purifying exhaust discharged from the engine by using an additive; deflecting means disposed upstream of the catalytic device in the exhaust passage, for allowing the exhaust to flow through downstream and deflecting the flow of the exhaust, thereby causing the exhaust to be agitated; additive injection means disposed downstream of the deflecting means in the exhaust passage, for injecting an additive into the exhaust passage; temperature detection means disposed downstream of the deflecting means in the exhaust passage, for detecting exhaust temperature; and control means for controlling the additive injection means on the basis of the exhaust temperature detected by the temperature detection means, wherein the temperature detection means has a temperature detection part located within a region where the flow of the exhaust deflected and thereby increased in velocity when passing through the deflecting means maintains a state in which the velocity is increased.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Figure 1:
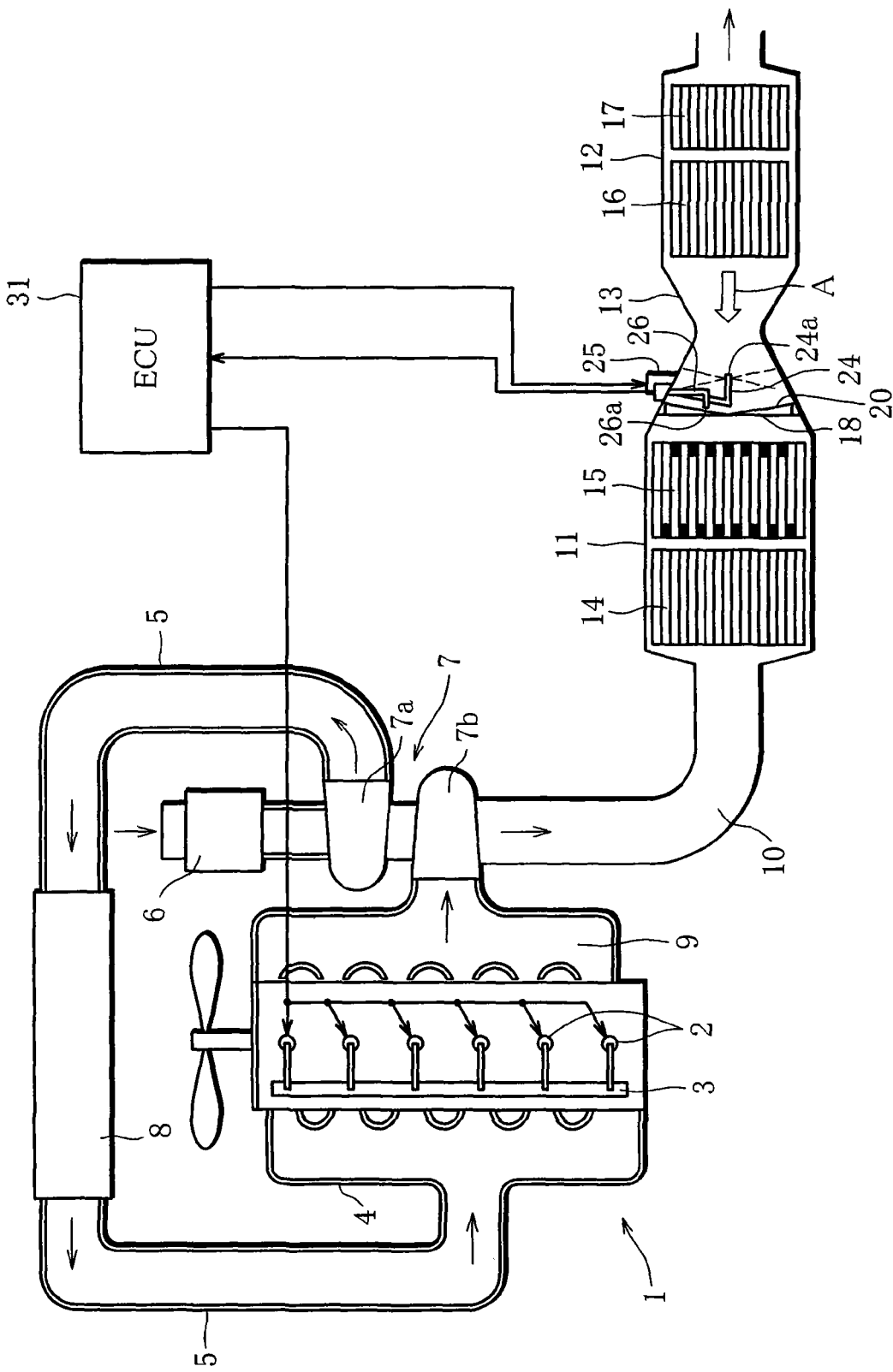
FIG. 1 is an overall structural view showing a diesel engine having an exhaust purification device according to one embodiment of the present invention.

Referring to the drawings attached, an exhaust purification device for an engine according to one embodiment of the present invention will be described.

FIG. 1 is an overall structural view showing a diesel engine (hereinafter referred to as an engine) 1 having an exhaust purification device according to the embodiment. The engine 1 is an inline 6-cylinder engine, where a fuel injection valve 2 is provided for each cylinder of the engine 1. Pressurized fuel is supplied to the respective fuel injection valves 2 by means of a common rail 3, and each fuel injection valve 2 injects fuel into its associated cylinder by being opened at timing determined depending on the operating state of the engine 1.

An intake manifold 4 for supplying intake air to the engine 1 is connected to the intake side of the engine 1. An intake passage 5 connected to the intake manifold 4 includes an air cleaner 6, a compressor 7a of a turbocharger 7, and an intercooler 8 arranged in the direction of intake air flow, in this order.

An exhaust manifold 9 for discharging exhaust from the engine 1 is connected to the exhaust side of the engine 1. At the outlet of the exhaust manifold 9, there is provided a turbine 7b of the turbocharger 7, mechanically linked with the compressor 7a by a shared axis. An exhaust pipe 10 is connected to the turbine 7b.

While the engine 1 is operating, intake air drawn to the intake passage 5 through the air cleaner 6 is compressed by the compressor 7a of the turbocharger 7, then passes through the intercooler 8, then is distributed to the cylinders through the intake manifold 4, and then drawn into the respective cylinders in the intake stroke. Fuel is injected from each fuel injection valve 2 into its associated cylinder at predetermined timing, and the fuel ignites to burn in the cylinder at around the top dead center in the compression stoke. Exhaust resulting from the combustion of fuel drives the turbine 7b to rotate after passing though the exhaust manifold 9, and passes through the exhaust pipe 10 to be emitted to the outside.

An exhaust purification device according to the embodiment of the present invention is incorporated in the exhaust pipe 10. The exhaust purification device includes an upstream casing 11, a downstream casing 12, and a mixing chamber 13 provided between the two casings 11, 12. Thus, in addition to the exhaust pipe 10, the upstream casing 11, the mixing chamber 13 and the downstream casing 12 constitute an exhaust passage.

Within the upstream casing 11, a pre-stage oxidation catalyst 14 and a DPF (diesel particulate filter) 15 are arranged in the direction of exhaust flow, in this order. Within the downstream casing 12, an SCR catalyst (selective reduction-type NOx catalyst, which is corresponding to "catalytic device" in the present invention) 16 and a post-stage oxidation catalyst 17 are arranged in the direction of exhaust flow, in this order. The mixing chamber 13 is, as a whole, in the shape of a venturi constricted in the middle. Specifically, from the rear end of the upstream casing 11, the mixing chamber tapers, or gradually diminishes in diameter in the direction of exhaust flow, and then gradually increases in diameter to join to the front end of the downstream casing 12.

Within the mixing chamber 13, on the upstream side, there is provided a fin unit 18 (deflecting means). The fin unit 18 is made by subjecting a disk-shaped base plate 19 of steel to press forming, and has an annular array of 8 fins 20. The circumference of the base plate 19 is welded to the inner wall surface of the mixing chamber 13, so that the base plate 19 divides the interior of the mixing chamber 13 into upstream and downstream sections.

Figure 2:
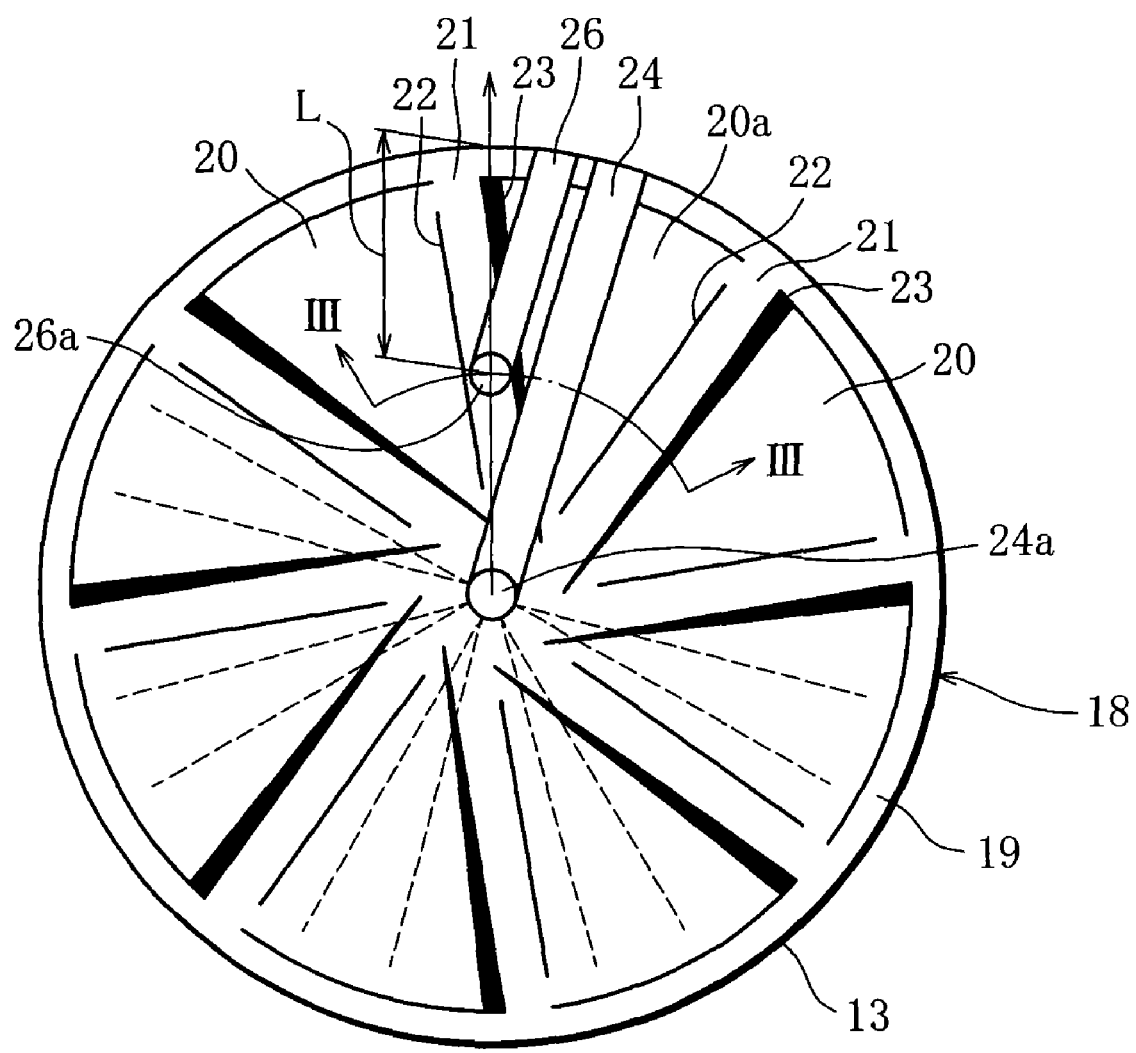
FIG. 2 is a diagram showing a fin unit viewed in the direction of arrow A in FIG. 1, namely from the downstream side relative to exhaust flow.
Figure 3:
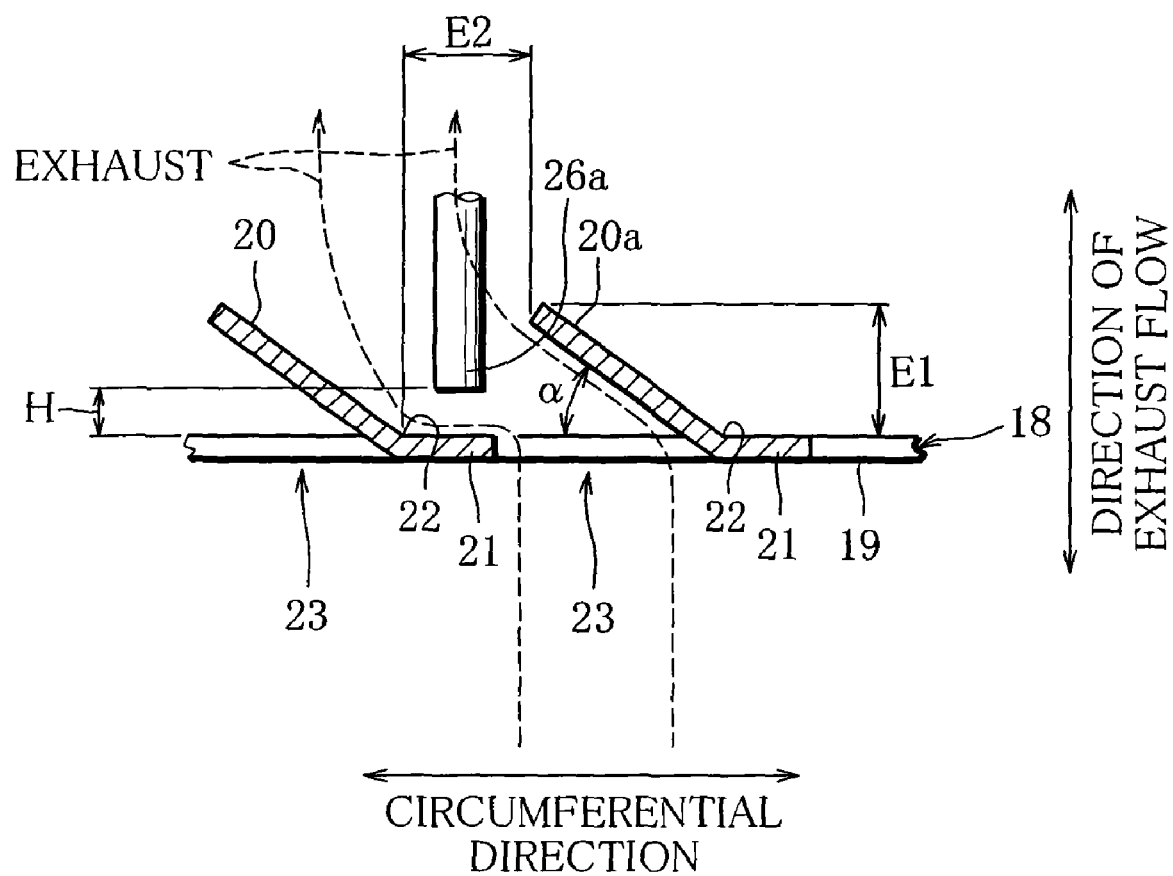
FIG. 3 is a diagram showing a cross-section of the fin unit along line III-III in FIG. 2.

FIG. 2 is a diagram showing the fin unit 18 viewed in the direction of arrow A in FIG. 1, namely from the downstream side, and FIG. 3 is a diagram showing a cross-section of the fin unit 18 along line III-III in FIG. 2. In FIG. 3, the direction of the exhaust flow is from the bottom to the top. On the base plate 19, 8 connection portions 21 running from the center to the circumference are defined, and approximately triangular portions between the connection portions 21 form the above-mentioned fins 20. Although the longitudinal central axis of each connection portion 21 does not run through the center of the base plate 19, the arrangement of the connection portions is not limited to this. The connection portions 21 may be defined to have a longitudinal central axis running through the center of the base plate 19.

Each fin 20 is connected to an adjacent connection portion 21 by a boundary line 22 on one side (first side) and separated from an adjacent connection portion 21 on the other side (second side) by being punched in press forming. Similarly, each fin 2 is separated from a peripheral portion of the base plate 19 by being punched in press forming. In press forming, each fin 20 is bent from the first-side connection portion 21 along the boundary line 22. Consequently, the respective fins 20 rise from the base plate 19 in the direction of exhaust flow, at the same angle α to the base plate 19. By raising the fins 20 in this manner, passage holes 23, approximately triangular in shape and connecting the upstream side and the downstream side of the base plate 19, are provided in the base plate 19. Although in the present embodiment the fin angle α is set to 10°, the fin angle α and the number of fins 20 may be changed as desired.

Within the mixing chamber 13, downstream of the fin unit 18, there is provided an injection nozzle 24 (additive injection means). The injection nozzle 24 extends from the circumference to the center of the mixing chamber 13 and has a distal end 24a located in the center of the mixing chamber 13 and directed downstream relative to the exhaust flow. To the injection nozzle 24, urea aqueous solution (additive) is supplied at a predetermined pressure, from a urea tank (not shown), via a solenoid valve 26 arranged on the outer side of the mixing chamber 13. According to the opening and closing of the solenoid valve 25, the injection nozzle 24 injects the urea aqueous solution through a plurality of injection holes at the distal end 24a towards the circumference of the mixing chamber 13, radially. Although not shown in the Figure, the injection holes of the injection nozzle 24 are provided at evenly-distributed 8 locations, corresponding to the 8 fins 20 of the fin unit 18. Thus, the urea aqueous solution is injected from the respective injection holes in a manner corresponding to the respective fins 20, as indicated in broken lines in FIG. 2.

Near the injection nozzle 24, a temperature sensor 26 (temperature detection means) for detecting the temperature T of exhaust flowing through the mixing chamber 13 is provided. The temperature sensor 26 extends from the circumference toward the center of the mixing chamber 13 and has a temperature detection part 26a at the distal end, directed upstream relative to the exhaust flow (toward the fin unit 18). The temperature detection part 26a of the temperature sensor 26 is disposed near the passage hole 23 corresponding to a predetermined particular fin 20a. Any of the 8 fins 20 may be selected as the particular fin 20a, and the selection may be changed as desired.

More specifically, as shown in FIG. 2, on a radius from the center of the mixing chamber 13 (in agreement with the distal end 24a of the injection nozzle 24), the temperature detection part 26a is located a distance L to the center, relative to the circumference of the mixing chamber 13. Further, as shown in FIG. 3, the temperature detection part 26a is a distance H (4 mm, for example) apart from the surface of the base plate 19 in the direction of exhaust flow. Further, as seen from FIGS. 2 and 3, the temperature detection part 26a is in agreement with the connection portion 21 supporting the fin 20 adjacent to the particular fin 20a, in the circumferential direction of the mixing chamber 13 (direction of the array of the fin 20).

Sensors including the temperature sensor 26 are connected to the input side of an electronic control unit abbreviated to ECU 31 (control means), while devices including the fuel injection valves 2 and the solenoid valve 25 associated with the injection nozzle 24 are connected to the output side of the ECU 31. The ECU 31 drives and controls the devices on the basis of the output of the sensors. For example, the ECU 31 sets fuel injection quantity on the basis of engine revolving speed Ne and accelerator depression amount θacc, using maps (not shown) defining the relation between these parameters, and sets fuel injection timing on the basis of engine revolving speed Ne and fuel injection quantity, using maps (not shown) defining the relation between these parameters. The ECU 31 drives the engine 1 by driving and controlling the fuel injection valves 2 on the basis of the fuel injection quantity and fuel injection timing thus set.

Further, in order to supply ammonia ($NH_3$) to the SCR catalyst 16 so that the SCR catalyst 16 can perform reduction of NOx to purify the exhaust, the ECU 31 sets target injection quantity for urea aqueous solution on the basis of exhaust temperature T detected by the temperature sensor 26. The ECU 31 drives and controls the solenoid valve 25 on the basis of the target injection quantity thus set, thereby causing the injection nozzle 24 to inject urea aqueous solution.

In the present embodiment, by positioning the temperature detection part 26a of the temperature sensor 26 as described above, the phenomenon that the urea aqueous solution injected from the injection nozzle 24 adheres to the temperature sensor 26 is prevented. Next, how the exhaust flows within the mixing chamber 13 and how the urea aqueous solution is diffused and atomized will be explained.

The exhaust discharged from the engine 1 flows through the intake manifold 10 into the upstream casing 11. While the exhaust is passing though the DPF 15 after the pre-stage oxidation catalyst 14, PM (particulate matter) in the exhaust is trapped in the DPF 15. Then, the exhaust flows into the mixing chamber 13 and diverges toward each of the passage holes 23 in the fin unit 18. Immediately after passing through the passage holes 23, the exhaust hits the fins 20 and is deflected according to the fin angle. Consequently, within the mixing chamber 13, the exhaust forms whirling flow, into which urea aqueous solution is injected from the injection nozzle 24. The whirling flow of the exhaust once decreases and then increases in radial size according to the varying cross-sectional area of the mixing chamber 13, which allows the urea aqueous solution to be diffused in the exhaust and atomized in a good manner. While being conveyed within the mixing chamber 13, the urea aqueous solution is hydrolyzed by heat and vapor in the exhaust to form ammonia. Being supplied with the ammonia thus formed, the SCR catalyst 16 reduces NOx in the exhaust to convert NOx into harmless $N_2$, so that the exhaust is purified. Ammonia not consumed in the reduction is removed from the exhaust by the post-stage oxidation catalyst 17.

As mentioned above, the ECU 31 controls the injection of urea aqueous solution from the injection nozzle 24 on the basis of exhaust temperature T. Except when the urea aqueous solution injection is stopped since the exhaust temperature T is below an allowable lower limit or when the engine 1 is in an operating region not requiring the reduction of NOx by the SCR catalyst 16, urea aqueous solution is injected from the injection nozzle 24 into the mixing chamber 13.

As clear from FIG. 1, the temperature detection part 26a of the temperature sensor 2 is somewhat upstream of the distal end 24a of the injection nozzle 24. However, since the urea aqueous solution is injected from the distal end 24a of the injection nozzle 24 radially, if the fin unit 18 is not provided or not appropriately provided, part of the urea aqueous solution injected reaches the temperature detection part 26a of the temperature sensor 2 upstream, against the exhaust flow. This causes the departure of the value detected by the temperature sensor 26 from the actual exhaust temperature T.

In order to alleviate such problem, it is conceivable to arrange the injection nozzle 24 to inject the urea aqueous solution toward downstream side. In this case, however, the urea aqueous solution is supplied to the SCR catalyst 16 in an insufficiently diffused/atomized state, which leads to lower NOx reduction performance of the SCR catalyst 16. Thus, the urea aqueous solution needs to be injected more or less toward the circumference of the mixing chamber 13, radially, and therefore, inevitably adheres to the temperature sensor 26, if the fin unit 18 is not provided or not appropriately provided.

Here, for confirmation, how the exhaust flows before and after the fin unit 18 in the present embodiment will be described. The total opening area of the 8 passage holes 23 of the fin unit 18 is much smaller than the flow passage area of the mixing chamber 13 before and after the fin unit 18. Thus, the exhaust flow is constricted by the passage holes 23 of the fin unit 18 and therefore increased in velocity, and immediately after that, further increased in velocity by being deflected according to the fin angle as mentioned above. It is to be noted that, as mentioned above, while the section of the mixing chamber 13 downstream of the fin unit 18 contains urea aqueous solution in an atomized state, the section of the mixing chamber 13 upstream of the fin unit 18 contains only exhaust, namely does not contain urea aqueous solution. Thus, the exhaust not containing urea aqueous solution passes through the passage holes 23 of the fin unit 18. Such exhaust spouts out of the passage holes 23 at high velocity as indicated in broken lines in FIG. 3. This establishes a region always occupied by exhaust containing little urea aqueous solution (hereinafter referred to as an adhesion prevention region), downstream of the fin unit 18, near the passage holes 23.

The exhaust having passed through the passage holes 23 does not mix with the urea aqueous solution as long as the exhaust flow maintains high velocity. Consequently, the adhesion prevention region extends only near the passage holes 23. Specifically, as shown in FIG. 3, since the exhaust flow maintains sufficiently high velocity in the region defined by the fin height E1 measured from the surface of the base plate 19 to the distal end of the particular fin 20a in the direction of exhaust flow, and the distance E2 measured from the distal end of the particular fin 20a to the boundary line 22 at the proximal end of the adjacent fin 20 in the circumferential direction of the mixing chamber 13, this region can be regarded as the adhesion prevention region.

As mention above, the temperature detection part 26a of the temperature sensor 26 is the distance H apart from the surface of the base plate 19, and this distance H is within the height E1. Further, as seen from FIGS. 2 and 3, the temperature detection part 26a of the temperature sensor 26 is in agreement with the connection portion 21 connected with the fin 20 adjacent to the particular fin 20a, in the circumferential direction of the mixing chamber 13, and therefore within the distance E2. Consequently, the temperature detection part 26a is within the adhesion prevention region. Because of such positioning of the temperature detection part 26a, even when the urea aqueous solution injected from the injection nozzle 24 and atomized spreads within the mixing chamber 13, the adhesion of urea aqueous solution to the temperature detection part 26a is prevented, so that the problem that the urea aqueous solution adhering to the temperature detection part causes the temperature detection part to detect a temperature lower than the actual exhaust temperature is prevented.

Figure 4:
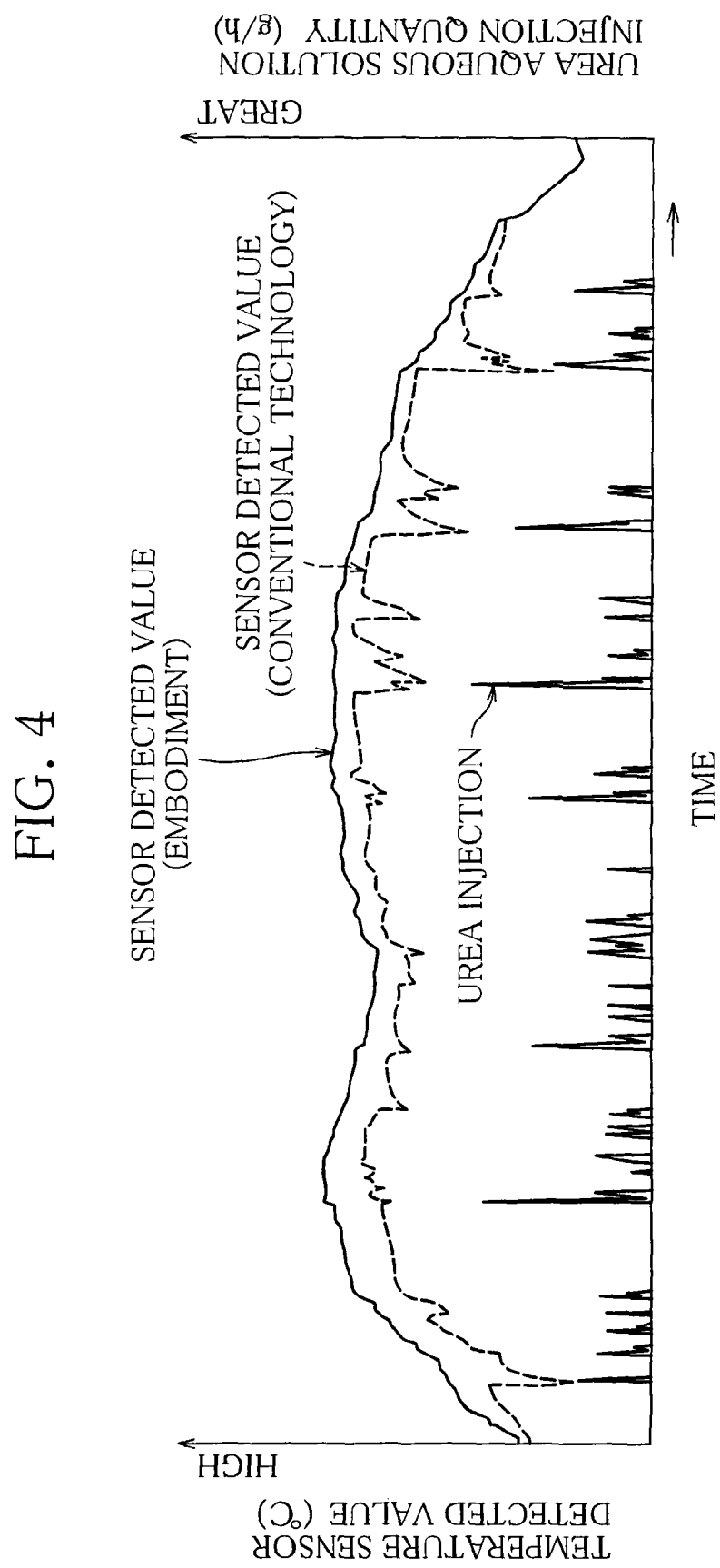
FIG. 4 is a graph showing how exhaust temperature is detected in the embodiment and in the conventional technology, obtained in comparative test.

In FIG. 4, how the exhaust temperature T is detected in the present embodiment is indicated in a solid line. As seen in FIG. 4, the exhaust temperature T is detected stably, without being influenced by the urea aqueous solution injection, from which it can be inferred that the adhesion of the urea aqueous solution to the temperature detection part 26a is prevented effectually as desired. Incidentally, the graph in FIG. 4 shows that at times other than the times of urea aqueous solution injection, the temperature sensor 26 detected value in the present embodiment differs from that in the conventional technology by an approximately constant amount. Such difference does not arise from the adhesion of urea aqueous solution, but from the difference in the location of the temperature sensor part 26a.

As described above, in the present embodiment of exhaust purification device, the temperature sensor part 26a of the temperature sensor 26 is positioned within the adhesion prevention region where the exhaust flow has high velocity, near the passage holes 23 of the fin unit 18. Consequently, the phenomenon that the urea aqueous solution injected form the injection nozzle 24 adheres to the temperature detection part 26a is prevented, which enables optimal control over the urea aqueous solution injection from the injection nozzle 24, on the basis of the exhaust temperature T always detected with high accuracy.

Further, the present embodiment of exhaust purification device can prevent the problem that although the exhaust is actually at the temperature that allows the reduction of NOx to be caused by injecting the urea aqueous solution, it is determined that the exhaust temperature is below an allowable lower limit, so that the urea aqueous solution injection is stopped, and therefore can purify the exhaust by reducing NOx at appropriate times.

Further, the present embodiment of exhaust purification device can set the optimal amount of urea aqueous solution to be injected, on the basis of the exhaust temperature T detected with high accuracy. Consequently, it can prevent, for example, an increase in urea aqueous solution consumption and ammonia slip from the SCR catalyst 16 caused by an excess of the urea aqueous solution. Conversely, the present embodiment can also prevent lowering of NOx reduction performance of the SCR catalyst 16 caused by a lack of the urea aqueous solution. For these reasons, the present embodiment can always exhibit a good exhaust purifying performance by making the best use of the NOx-reduction function of the SCR catalyst 16.

In manufacturing, the adhesion prevention region within which the temperature detection part 26a of the temperature sensor 26 should be positioned can be easily identified on the basis of positional relationships with the base plate 19, the fins 20, the boundary lines 22, etc., which allows the exhaust purification device to be manufactured with high productivity.

As a measure for preventing the adhesion of urea aqueous solution to the temperature detection part 26a of the temperature sensor 26, disposing the temperature sensor 26 upstream of the fin unit 18 is conceivable. In this case, however, a space for the temperature sensor 26 needs to exist between the DPF 15 and the fin unit 18, which leads to an increase in size of the exhaust purification device. In addition, replacement of the deteriorated DPF 15 necessitates detaching and attaching of the temperature sensor 26 simultaneously, which constitutes a constraint on maintenance. The present embodiment of exhaust purification device can prevent the adhesion of urea aqueous solution without disposing the temperature sensor 26 upstream, and therefore can avoid such problems.

Although in the present embodiment, the temperature detection part 26a is positioned the distance H apart from the surface of the base plate 19 and in agreement with the connection portion 21 in the circumferential direction of the mixing chamber 13, the positioning of the temperature detection part 26a is not restricted to this. Specifically, the temperature detection part 26a may be positioned at any location, as long as it is within the adhesion prevention region defined by the above-mentioned fin height E1 and distance E2. It is to be noted, however, that positioning the temperature detection part 26a too close to the fin unit 18 results in a detected value higher than the actual exhaust temperature, since the temperature detection part 26a is subjected to heat radiated from the fin unit 18. Thus, an extremely small fin height E1 is undesirable. The temperature detection part 27a should desirably be positioned within the region excluding a section corresponding to the fin height E1 close to 0 (0 to 2 mm, for example).

Unlike the fin height E1 and the distance E2, the distance L used to indicate the location of the temperature detection part 26a is not a parameter directly defining the adhesion prevention region, and can be varied on the radius of the mixing chamber 13, as desired. It is to be noted, however, that the passage hole 23 as well as the fin 20 increases in circumferential width, radially outward, i.e., toward the circumference of the mixing chamber 13, so that, at more radially-outward location, the fin height E1 and the distance E2 are greater and therefore define greater adhesion prevention region. In manufacturing, it is almost unavoidable that the temperature detection part 26a is positioned with a certain level of error. Greater adhesion prevention region, however, allows greater positioning error. Thus, as long as other restrictions, for example, restrictions in connection with interfering with the injection nozzle 24, do not arise or can be disregarded, smaller distance L, namely, more radially-outward location of the temperature detection part 26a is more desirable, since it leads to the allowability of greater error in positioning the temperature detection part 26a, therefore, contributes to increase in productivity.

In the above, an embodiment has been described. The configuration of the present invention is, however, not restricted to the described embodiment of exhaust purification device. For example, although the described embodiment of the present invention is an exhaust purification device for a diesel engine 1 provided with an SCR catalyst 16 for purifying exhaust, the present invention is applicable to any engine provided with a catalytic device requiring supply of an additive. For example, the present invention may be applied to an engine provided with an adsorption-type NOx catalyst disposed in the exhaust passage to adsorb NOx in exhaust. In such engine, it is necessary to regularly carry out NOx purge, in which fuel is injected into the exhaust passage as an additive to cause the adsorbed NOx to be discharged from the NOx catalyst and reduced. In this case, the configuration shown in FIG. 1 is modified such that the SCR catalyst 16 is replaced with an adsorption-type NOx catalyst, and that the injection nozzle 26 injects fuel in place of urea aqueous solution. In such exhaust purification device, fuel adhesion to the temperature sensor 26 can be prevented by positioning the temperature detection part 26a of the temperature sensor 26 in the same way as in the described embodiment. This allows the NOx purge to be performed on the basis of the exhaust temperature T detected with high accuracy.

In the described embodiment, the exhaust purification device includes, as a deflecting means, a fin unit 18 causing the exhaust to form whirling flow. The structure of the deflecting means is, however, not restricted to this, as long as it can allow the exhaust to flow through downstream and deflect the flow of exhaust, thereby causing the exhaust to be agitated. Regardless of varying specifics of structure, such deflecting means can produce the same effect as in the described embodiment, if the temperature detection part 26a of the temperature sensor 26 is positioned within an adhesion prevention region identified as a region where the exhaust flow is deflected and has increased velocity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust purification device for an engine, comprising:
    a catalytic device disposed in an exhaust passage of the engine, for purifying exhaust discharged from the engine by using an additive;
    deflecting means disposed upstream of the catalytic device in the exhaust passage, for allowing the exhaust to flow through downstream and deflecting the flow of the exhaust, thereby causing the exhaust to be agitated;
    additive injection means disposed downstream of the deflecting means in the exhaust passage, for injecting an additive into the exhaust passage;
    temperature detection means disposed downstream of the deflecting means in the exhaust passage, for detecting exhaust temperature; and
    control means for controlling the additive injection means on the basis of the exhaust temperature detected by the temperature detection means,
    wherein the temperature detection means has a temperature detection part located within a region where the flow of the exhaust deflected and thereby increased in velocity when passing through the deflecting means maintains a state in which the velocity is increased,
    wherein the deflecting means comprises:
        a base plate dividing the exhaust passage into upstream and downstream sections, the base plate having an annular array of a plurality of passage holes defined by a plurality of radially-extending connection portions, and
        a plurality of fins extending continuously from the respective connection portions to the same side, in a manner following the annular array, the fins being raised from the base plate to project downstream,
    wherein the deflecting means allows the exhaust to flow through the passage holes and deflects the flow of the exhaust with the fins, thereby causing the exhaust to form whirling flow in the downstream section of the exhaust passage, and
    wherein the temperature detection part of the temperature detection means is located near the passage hole corresponding to a particular fin of the fins, between the edge of the particular fin and the base plate in the direction perpendicular to the base plate, and between the edge of the particular fin and the boundary connecting the fin adjacent to the edge of the particular fin with the connection portion in the direction of array of the fins.

2. The exhaust purification device for the engine according to claim 1, wherein
    the catalytic device is a selective reduction-type NOx catalyst designed to selectively reduce NOx in the exhaust by using ammonia as a reducing agent; and
    the additive injection means injects urea aqueous solution as the additive.

* * * * *